(12) United States Patent
Belisario et al.

(10) Patent No.: US 9,552,810 B2
(45) Date of Patent: Jan. 24, 2017

(54) CUSTOMIZABLE AND INDIVIDUALIZED SPEECH RECOGNITION SETTINGS INTERFACE FOR USERS WITH LANGUAGE ACCENTS

(71) Applicant: International Business Machines Corporation, Armonk, NY (US)

(72) Inventors: Ella Belisario, Boca Raton, FL (US); Judith M. Combs, Stuart, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/673,959

(22) Filed: Mar. 31, 2015

(65) Prior Publication Data

US 2016/0293159 A1  Oct. 6, 2016

(51) Int. Cl.
G10L 15/06 (2013.01)
G10L 21/00 (2013.01)
G10L 15/00 (2013.01)
G10L 15/07 (2013.01)

(52) U.S. Cl.
CPC ............ G10L 15/07 (2013.01); G10L 15/063 (2013.01)

(58) Field of Classification Search
None
See application file for complete search history.

(56) References Cited

U.S. PATENT DOCUMENTS

| 7,206,303 | B2 | 4/2007 | Karas et al. |
| 7,389,228 | B2 | 6/2008 | Rajput et al. |
| 7,853,626 | B2 | 12/2010 | Jung et al. |
| 8,036,893 | B2 | 10/2011 | Reich |
| 8,046,224 | B2 | 10/2011 | Rajput et al. |
| 8,175,882 | B2 * | 5/2012 | Basson ................ G06F 17/289 434/156 |
| 8,417,530 | B1 * | 4/2013 | Hayes ............... G06F 17/30026 704/1 |
| 9,043,199 | B1 * | 5/2015 | Hayes .................... G10L 15/26 704/1 |

(Continued)

FOREIGN PATENT DOCUMENTS

CN   101192404 B   7/2011
CN   102117614 A   7/2011

(Continued)

OTHER PUBLICATIONS

Vergyri et al., "Automatic Speech Recognition of Multiple Accented English Data", INTERSPEECH, Sep. 26-30, 2010, pp. 1652-1655.

(Continued)

*Primary Examiner* — Satwant Singh
(74) *Attorney, Agent, or Firm* — Michael A. Petrocelli

(57) ABSTRACT

A computer implemented method and system for customizing speech recognition for users with accents. A spoken language of a user is identified. An indicator of a speech accent language can be initiated by the user using a computer. The indicator identifies the speech accent language and defines an influence of the speech accent language on the spoken language. Speech recognition characteristics are set according to the spoken language and the indicator. An automatic speech recognition (ASR) conversion is adjusted based on the speech recognition characteristics.

11 Claims, 3 Drawing Sheets

(56) References Cited

U.S. PATENT DOCUMENTS

| | | | |
|---|---|---|---|
| 9,390,085 B2* | 7/2016 | Bhattacharya | G10L 25/51 |
| 2003/0088397 A1 | 5/2003 | Karas et al. | |
| 2004/0073425 A1 | 4/2004 | Das et al. | |
| 2007/0129947 A1 | 6/2007 | Agapi et al. | |
| 2008/0082522 A1 | 4/2008 | Jung et al. | |
| 2008/0147404 A1 | 6/2008 | Liu et al. | |
| 2008/0183473 A1 | 7/2008 | Nagano et al. | |
| 2010/0031143 A1 | 2/2010 | Rao et al. | |
| 2011/0119051 A1 | 5/2011 | Li et al. | |
| 2012/0215535 A1 | 8/2012 | Wasserblat et al. | |
| 2012/0278076 A1 | 11/2012 | Lloyd et al. | |
| 2013/0253909 A1* | 9/2013 | Bhattacharya | G10L 25/51 704/9 |

FOREIGN PATENT DOCUMENTS

| | | |
|---|---|---|
| DE | 60030920 T2 | 4/2007 |
| EP | 1233406 A1 | 8/2002 |
| EP | 1239459 A1 | 9/2002 |
| EP | 1418570 A1 | 5/2004 |
| EP | 1264301 B1 | 8/2005 |
| EP | 1571651 A1 | 9/2005 |
| GB | 2480538 A | 11/2011 |
| WO | 0139180 A1 | 5/2001 |
| WO | 02063599 A1 | 8/2002 |
| WO | 2012049368 A1 | 4/2012 |

OTHER PUBLICATIONS

Kamper et al., "Multi-accent speech recognition of Afrikaans, Black and White varieties of South African English", INTERSPEECH, 2011.

Nallasamy, "Acoustic and Lexical Modeling Techniques for Accented Speech Recognition", PhD Thesis Proposal, Language Technologies Institute, School of Computer Science, Aug. 2012.

* cited by examiner

CUSTOMIZABLE AND INDIVIDUALIZED SPEECH RECOGNITION SETTINGS INTERFACE FOR USERS WITH LANGUAGE ACCENTS

BACKGROUND

The present disclosure relates to a method and system for managing speech recognition settings using an interface, and more particularly, managing speech recognition settings for users having one or more accents. A spoken language at a location in the world, for example, can be used by a person to communicate with other people, to give commands to a receiving device, or to be translated into text by a device. Devices can include speech interfaces to assist users with a local language they may not be familiar with. Currently technology recognition software applications can use model formulas which can be attained by various means. In one example, interfaces can be command driven, where users can speak a predefined set of commands. Other interfaces allow free form of speech and attempt to interpret it and perform a set of actions as a result of speech interpretation with improvements as the application learns the user's language usage. Manufacturers or providers of such devices typically pre-set one language as a default, but provide the user with the option to change the primary speaking language if needed. Any language option assumes that a speaker voice pattern is normalized or typical for the chosen language.

Known speech recognition engines may include an automatic speech recognition (ASR) engine which supports multiple language recognition capabilities with a predefined set of assumptions. Typical speech recognition engines include training time for training a user's vocabulary where the application is trained to recognize words spoken by the user, to reach a peak of associating hits of the natural language of the user to the translated words.

SUMMARY

According to an aspect of the present invention, a computer implemented method for customizing speech recognition for users with language accents includes identifying a spoken language of a user. The method includes receiving an indicator of a speech accent language initiated by the user using a computer. The indicator identifies the speech accent language and defines an influence of the speech accent language on the spoken language. Speech recognition characteristics are set according to the spoken language and the indicator. An automatic speech recognition (ASR) conversion is adjusted based on the speech recognition characteristics.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
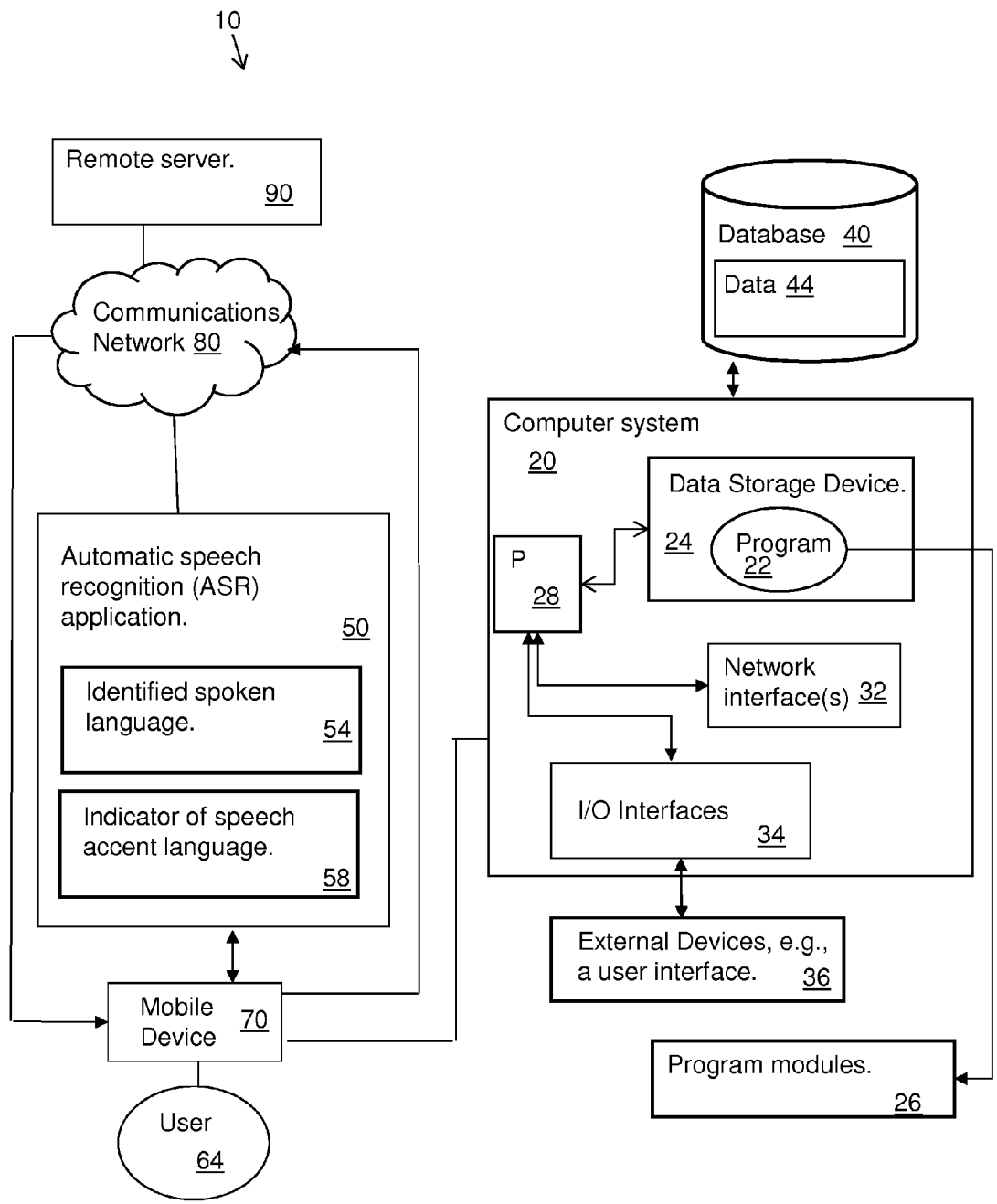
FIG. 1 is a schematic block diagram illustrating an overview of a system and methodology for customizing speech recognition for users with accents according to an embodiment of the disclosure.
Figure 2:
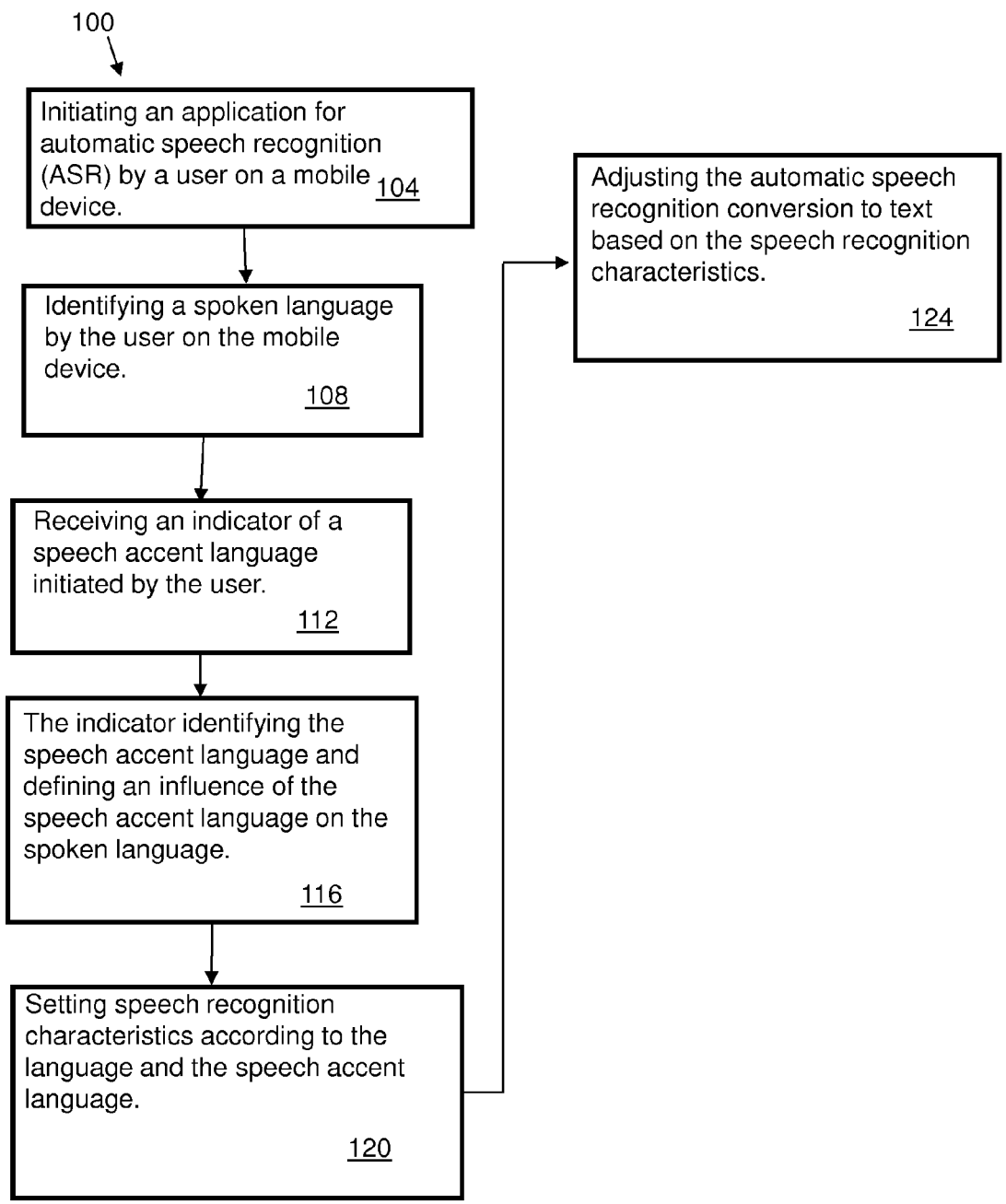
FIG. 2 is a flow chart illustrating a method for customizing speech recognition for users with accents based on FIG. 1 according to an embodiment of the disclosure.

Referring to FIGS. 1 and 2, a system 10 and method 100 for customizing speech recognition for a user with accents, according to an embodiment of the disclosure, is discussed. An application 50 for automatic speech recognition (ASR) is initiated by a user 64, as in block 104, for example on a mobile device 70. The method 100 identifies a spoken language 54 by the user 64, as in block 108. The spoken language is the language that the ASR will be interpreting or converting. The user can select the language for speech recognition. For example, the ASR can translate the spoken language of the user into text. In one example, the ASR can also be part of a technique to interpret the spoken language for an assistance program which can interpret the spoken language to assist in a search for data. In another example, the ASR can also be part of a technique to translate one language into another language.

The spoken language 54 of a user can be identified, for example, by the user selecting a spoken language, or a default language can be automatically selected based on the location of a device. The method 100 also receives an indicator 58 of a speech accent language initiated by the user 64 using the mobile device 70, as in block 112. The indicator 58 identifies the speech accent language and defines the extent or influence of the speech accent language on the user's spoken language, as in block 116. The indicator can include a numbered scale identifying high to low influence of the speech accent language in relation to the spoken language. For example, the spoken language can be indicated as English, and the accent language as Russian. The indicator can also identify the influence of the accent language on the spoken language, for instance, along a scale indicating heavily influence to slight influence of an accent language on the user's spoken language.

The indicator can also be used to define the influence of a regional accent on a spoken language. The influence of the speech accent language can be graduated to determine a degree of influence measuring the amount of accent of one language on another language. The indicator represents a measurement of the influence of an accent language on a spoken language, for example, a speaker's native accent languages influence on a spoken language.

Block 120 of the method 100 includes setting speech recognition characteristics according to the spoken language and the indicator of the speech accent language. Thus, the speech recognition characteristics capture the influence of the speech accent on the spoken language. The automatic speech recognition (ASR) conversion to text is adjusted based on the speech recognition characteristics, in block 124. Thereby, the ASR can more accurately translate the speech of the spoken language of the user into text. Using the method and system of the present disclosure, recognition of a spoken language of a user can be enhanced as one or more accents are compensated for in the recognition process of the ASR system, and thereby raising the recognition rate of the ASR system when translating the spoken language of the user. The ASR system, for example, can be embodied as a program, or a service.

The users 64 may use a device, for instance a mobile device 70 to access an ASR application 50. The mobile device 70 is one embodiment of a device having a computer, other devices may include, for example, a Personal Data Assistant (PDA), a cell phone, or a notebook, or the like. The device can be configured to send and receive electronic communications. The computer 20 is a generic representation of a computer which may be embodied in a device such as a hand held device, or can also represent a server for providing the method of the present disclosure as a service which can be accessible using the Internet or a network.

The method 100 may be embodied in a program 22 (FIG. 1) embodied on a computer readable storage device, e.g., data storage device 24. The program 22 is executable by a processor 28 of a computer system 20 (to execute program steps, code, or program code). Great. Thanks. Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program.

The method 100 can be part of an automatic speech recognition application or an add-on application working with an automatic speech recognition application. The method can be run locally on a device such as the mobile device, or can be run as a service, for instance, on a remote server 90 which is accessed using a communications network 80.

The spoken language can be selected by the user from multiple language options or can be preset based on the location of the device from multiple language options. In another example, the indicator can be provided on a display of a computer or a mobile device for the user to adjust to indicate the influence of the accent language on the spoken language. Thus, the indicator can be adjustable to indicate the influence of the accent language on the spoken language selected by the user. In another example, the indicator can include a value identifying the speech accent language influence on the spoken language, for example, the numbers one through five or in another example ten. The number ten can indicate the largest influence on the spoken language of the user, in other words, a degree (or graduation) of influence on the spoken language. The value can also be stored and used in subsequent applications of an ASR application for the user.

Figure 3:
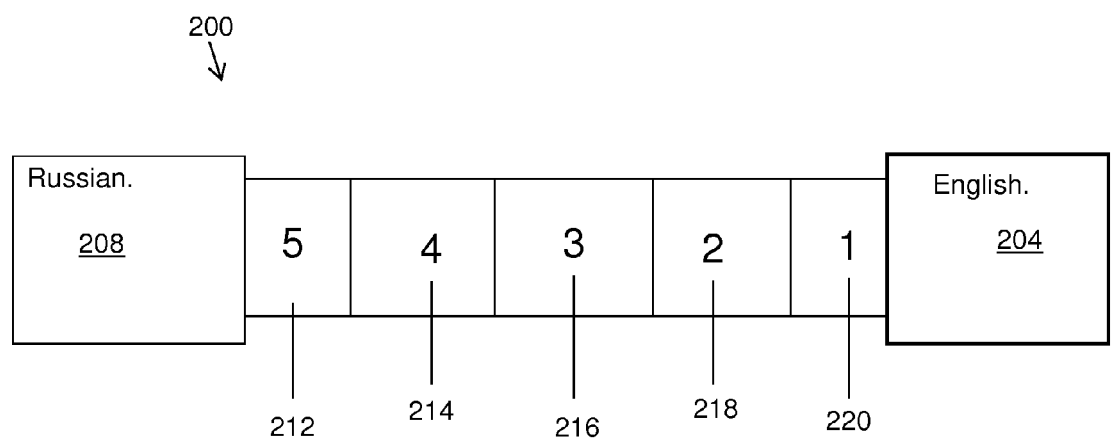
FIG. 3 is a schematic block diagram illustrating an interface according to an embodiment of the disclosure.

In another embodiment according to the present disclosure, a user can open an ASR application on a device, and the application can include a user interface. Referring to FIG. 3, the user interface can include can include a scale or spectrum 200 which is representative of an influence indicator with designations indicating a degree of influence. The scale 200 includes a selected language (i.e., a spoken language of the user), in this example English 204, and an accent language, in this example, Russian 208. The value can be selected from a plurality of speech accent language values one through five 212, 214, 216, 218, 220 representing a spectrum of an accent language's influence on the spoken language from one to five. The amount or the user's accent and influence on the translated language can also be characterized as a percentage. For example, a percentage of influence on the translated spoken language. For instance, fifty percent Russian accent language influence on English as the spoken language. Also, multiple language can be indicated and evaluated for influence similarly. For example, the English language can be the spoken language for translation, and the user can have a combination of Russian and German accents and influence.

The method and system of the present disclosure enables a speech recognition interface which provides a dynamic means to configure a customized accented language pattern to match a user. The user can adjust the language pattern to fit their unique speech combinations. For example, the user can combine two or more languages using the interface. For instance, the method and system of the present disclosure can be used by a user who speaks a second language, and speaks another language as their native language, for example, a combination of Spanish and English.

In the example shown in FIG. 3, the spoken language is English 204, and the accent language is Russian 208, and the scale includes values of one to five between the two languages. The user can select a value on the scale such as selecting the number one 220 which indicates a slight Russian accent. A heavy Russian accent of an English language speaker can be indicated by a user selecting the number five 212.

In another embodiment according to the present disclosure, a user can open an ASR application on a device, and the application can include a user interface where the user selects ASR settings options. The initial speech preference can be set to one hundred percent of the default language provided for the region. The user can then determine if they want to allow the ASR to automatically tune the language settings through normal use. If the user allows the ASR to set the initial speech pattern, the user can be requested to repeat a short paragraph, after which the ASR can then indicate, based on a set threshold, that it is low or within threshold limits of an acceptable rate of recognition.

In one embodiment, a back-end processing engine, with a provision to automatically recognize a user's accent, can send an update to the user's speech settings with a recognized language pattern. The update can be provided in the form of a specific number representing a speech pattern that will be associated with the user. If the back-end processing engine indicates a low accuracy evaluation, the user can be presented with an update request to their language profile, and the user can then accept or modify it through the ASR user interface. If the user chooses, or is requested to determine their language profile by invoking the ASR setting interface, it can, in one embodiment, allow the user to set their self-evaluated combination of language mixture in order to minimize the error rate for recognition based on the percentage or scale of their language mix. An input screen can provide a drop down with multiple languages to choose from for the user to select. The user can be asked to identify the degree of mixed languages by adjusting values such as percent, or a scale, or a set of scores (e.g., on the scale of 1-10, or 1-3 (low/med/high). The mixed language settings can be updated automatically by the ASR or manually by the user.

In another example, a user can use a smart phone with a speech recognition application. Upon first using the device, the user may find that the device is not recognizing most of the commands that are being given due to their accent. The user can access a voice recognition customization option, for instance located under user interface settings. In one example, the smart phone can be sold in the United States, and therefore has US English established as the default target language. The user may have recently moved from Russia to the United States, and therefore changes the initial customized speech recognition model to include Russian and English languages. In this example the user's native language is Russian and English is spoken with a Russian accent. In one instance, the user can set a slide bar as 70% Russian and 30% English for the spoken language as English, which indicates that English is spoken with a heavy Russian accent. In another example, the user can request additional language models to be added to the customized speech recognition model. An interface could show a pie chart accommodating the additional language options. The user receives the benefit of a lower error rate from the ASR application for the particular device, and achieving a lower error rate faster. Also a resultant standardized speech recognition number can be assigned which reflects the user's speech pattern.

The method and system of the present disclosure provides the user with a technique for direct input of their language pattern, which can be used to reduce the time for a speech recognition application to recognize and/or improve the success rate of word associations from the user (that is, the application's understanding of the user's spoken language), ultimately reducing input/output errors and increasing speech recognition functionality. Thus, the method and system of the present disclosure also enables the user to avoid or reduce training time for an application to reach a peak of hits for associating natural language to translations.

The method and system of the present disclosure allows a user to mix two or more language patterns to arrive at a language recognition closer to their spoken language which takes into account their accent which can reflect multiple languages and regional accents. The user can select levels for their mix of languages to provide the ASR mechanism with a starting point for a personalized speech recognition model. The method according to the present disclosure can be applied, for example, on a device, such as a mobile device, or provided as a service to work in concert with speech recognition applications.

The user interface according to the system/method of the present disclosure, allows the user to input their self-evaluated accent mix, and can also allow the recognition engine to adjust the mix as the user uses the recognition engine in a real time fashion such that the application can adjust a speech pattern mix. A unique customized speech pattern number can be input into a speech recognition device and/or system/service. A pattern number or standardization number can represent the continuum of speech patterns, similar to the spectrum standards used in printing so that various printing devices can produce the same output color no matter what input is used.

In one embodiment a mobile device such as a smart phone or a tablet with voice recognition features or applications can incorporate the method and system of the present disclosure. A voice recognition unit can use free form speech, as well as command driven speech recognition. Accented speech recognition problems can be alleviated by an implementation of personalized speech recognition settings.

In another embodiment, the method of the present disclosure can be accessed as a service. The user may communicate with an automated agent, and speech recognition settings can be set and retrieved and stored in a user account. A customer profile can also suggest a customized speech pattern number for a user.

Using the method and system of the present disclosure, users who do not have a pure language pattern (or also do not have a native language pattern) of a language can use the method and system of the present disclosure to support the users speech. Accents can be anticipated and adjusted for using an indicator and speech recognition characteristics according to the present disclosure. The method and system of the present disclosure also enables the user to avoid training time for an application to reach a peak of hits for associating natural language to translations.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer implemented method for customizing speech recognition for users with language accents, comprising:
   identifying a spoken language of a user;
   receiving an indicator of a speech accent language initiated by the user using a computer, the indicator identifying the speech accent language and defining an influence of the speech accent language on the spoken language, the indicator is provided on an interface of the computer, and the indicator is adjustable by the user to identify the influence of the speech accent language on the spoken language, wherein the indicator includes a value identifying the speech accent language influence on the spoken language;
   setting speech recognition characteristics according to the spoken language and the indicator;
   adjusting an automatic speech recognition (ASR) conversion based on the speech recognition characteristics;
   converting the spoken language of the user into text using the automatic speech recognition conversion; and
   receiving an adjustable value on a numbered scale as part of the indicator to identify the influence of the speech accent language on the spoken language, the adjustable value being set by the user and identifying an amount of influence of the accent language on the spoken language.

2. The method of claim 1, wherein the value is stored and used in subsequent ASR implementations for the user.

3. The method of claim 2, wherein the value is selected from a plurality of speech accent language values representing a spectrum of languages and their influence on the spoken language.

4. The method of claim 1, wherein the indicator is adjustable by the user, and the user identifies the spoken language from multiple language options.

5. The method of claim 1, wherein the indicator identifies a combination of accent languages and defines an influence of each of the speech accent languages, the indicator being adjustable by the user to identify the influence of each of the speech accent languages on the spoken language, and multiple values of the indicator identify the influence of each of the speech accent languages on the spoken languages.

6. A computer program product for customizing speech recognition for users with language accents, the computer program product comprising a computer readable storage medium having program instructions embodied therewith, wherein the computer readable storage medium is not a transitory signal per se, the program instructions executable by a computer to cause the computer to perform a method, comprising:

identifying, using the computer, a spoken language of a user;

receiving, using the computer, an indicator of a speech accent language initiated by the user using a computer, the indicator identifying the speech accent language and defining an influence of the speech accent language on the spoken language, the indicator is provided on an interface of the computer, and the indicator is adjustable by the user to identify the influence of the speech accent language on the spoken language, wherein the indicator includes a value identifying the speech accent language influence on the spoken language;

setting speech recognition characteristics, using the computer, according to the spoken language and the indicator;

adjusting, using the computer, an automatic speech recognition (ASR) conversion based on the speech recognition characteristics;

converting the spoken language of the user into text using the automatic speech recognition conversion; and receiving an adjustable value on a numbered scale as part of the indicator to identify the influence of the speech accent language on the spoken language, the adjustable value being set by the user and identifying an amount of influence of the accent language on the spoken language.

7. The computer program product of claim 6, wherein the value is stored and used in subsequent ASR implementations for the user.

8. The computer program product of claim 7, wherein the value is selected from a plurality of speech accent language values representing a spectrum of languages and their influence on the spoken language.

9. The computer program product of claim 6, wherein the indicator is adjustable by the user, and the user identifies the spoken language from multiple language options.

10. A computer system for customizing speech recognition for users with language accents, the computer system comprising:

one or more computer processors, one or more computer-readable storage media, and program instructions stored on one or more of the computer-readable storage media for execution by at least one of the one or more processors, the program instructions, comprising:

identifying a spoken language of a user;

receiving an indicator of a speech accent language initiated by the user using a computer, the indicator identifying the speech accent language and defining an influence of the speech accent language on the spoken language, the indicator is provided on an interface of the computer, and the indicator is adjustable by the user to identify the influence of the speech accent language on the spoken language, wherein the indicator includes a value identifying the speech accent language influence on the spoken language;

setting speech recognition characteristics according to the language and the indicator of the speech accent language;

adjusting an automatic speech recognition (ASR) conversion based on the speech recognition characteristics;

converting the spoken language of the user into text using the automatic speech recognition conversion; and receiving an adjustable value on a numbered scale as part of the indicator to identify the influence of the speech accent language on the spoken language, the adjustable value being set by the user and identifying an amount of influence of the accent language on the spoken language.

11. The system of claim 10, wherein the value is stored and used in subsequent ASR implementations for the user.

\* \* \* \* \*